United States Patent [19]

Salle et al.

[11] 4,197,071

[45] Apr. 8, 1980

[54] SAFETY DEVICE FOR CONTINUOUS ROTARY MOLDING MACHINES

[75] Inventors: Remy Salle, Evian les Bains; Jean-Marie Petre, Doubaine, both of France

[73] Assignee: Mueller Engineering & Manufacturing Company Incorporated, Chicago, Ill.

[21] Appl. No.: 947,069

[22] Filed: Sep. 29, 1978

[51] Int. Cl.² .................. B29C 17/07; B29C 29/00
[52] U.S. Cl. ................................. 425/142; 264/37; 264/40.7; 264/500; 264/543; 425/145; 425/152; 425/155; 425/217; 425/532
[58] Field of Search ............... 425/142, 145, 152, 155, 425/216, 217, 532, 540; 264/37, 40.7, 500, 543

[56] References Cited

U.S. PATENT DOCUMENTS

| | | | |
|---|---|---|---|
| 3,689,183 | 9/1972 | Denlinger | 264/37 X |
| 3,994,647 | 11/1976 | Flamand | 425/217 X |
| 4,007,244 | 2/1977 | Avery et al. | 264/543 |

Primary Examiner—Jan H. Silbaugh
Attorney, Agent, or Firm—Brumbaugh, Graves, Donohue & Raymond

[57] ABSTRACT

As described herein, there is provided safety apparatus for continuous rotary blow molding machines of the type wherein the extruder operates independently of the machine to continuously extrude plastic tube through its die head during the interruption of operation by the blow molding machine. The safety apparatus includes a blow tube mounted on the extruder for directing air under pressure against the plastic tube to deflect the tube away from the molds of the molding machine upon interruption of the operation of the blow molding machine. A conveyor, operative at the same time as the blow tube and extending in a direction coincident with the direction of pressurized air, receives the diverted plastic tube and carries the plastic tube to a receptacle. The blow tube and conveyor remain operative at least until the machine is restarted. In order to permit the plastic tube to resume its normal direction of discharge into the molds, there is also provided a cutting device for cutting the plastic tube right at the die head of the extruder a predetermined time after the machine is restarted. Finally, a safety gate, providing access to the molds of the machine when open, includes safety switches which disable the machine when the gate is open.

6 Claims, 8 Drawing Figures

SAFETY DEVICE FOR CONTINUOUS ROTARY MOLDING MACHINES

BACKGROUND OF THE INVENTION

This invention relates to safety apparatus for plastic molding machines and, more particularly, to safety apparatus that eliminates operator involvement in the operation of the machine from the time a fault is first detected until the time the fault is corrected.

This invention relates to safety apparatus having particular utility in rotary blow molding machines which produce molded articles, e.g., plastic bottles. In such machines, a hot plastic tube (parison) is continuously extruded from an extrusion die into circumferentially spaced molds mounted on the periphery of a ferris-wheel type supporting structure. Typically, the machine may include 14 molds and may rotate at a speed of 6 revolutions per minute. The parison is sequentially engaged by the molds which clamp off sections of the parison and sections extending between adjacent molds. The clamped off sections of the parison are sealed by the clamping action of the molds and air is injected into the sealed parison to expand it and cause it to conform to the contour of the molds. Further on in the rotation, the molds open to eject the blown plastic articles. The parison between the molds and connecting the blown articles is also separated from the machine for subsequent regrinding and reworking.

A practical feature of such machines is the fact that the parison is extruded continuously whether or not the machine is rotating. This provides for a homogeneous melt with a uniform heat profile. Because there is no interruption of the parison formation, there is less chance for degradation of the melt as it passes from the extruder through the die head.

There has been an attendant danger to the operator that occurs when, because of a fault in the operation, e.g. a blown article is not ejected, the machine will stop rotating and the production of the plastic article will be interrupted. The extruded parison, however, continues to flow into and accumulate in the mold located beneath the extruder. In order to remove the accumulated parison, the operator, wearing asbestos gloves, has got to first reach into the machine, manually remove the parison and then literally catch the flowing parison to prevent it from going into the mold. It will be appreciated that if the molds were to close on an excessive amount of parison located therein, the molds could suffer sever damage.

Once having removed the hot parison from the machine, the operator has got to wipe the die head clean and then very rapidly restart the machine. During the restarting cycle, the operator has both hands inside the machine in order to remove the excess parison. Because of this dangerous condition, the machine is throttled down to run at less-than-optimum speed and production is accordingly reduced.

SUMMARY OF THE INVENTION

Accordingly, it is an object of the present invention to provide safety apparatus for continuous plastic molding machines that eliminates operator involvement with the continuously extruded parison from the time a fault is first detected until the time the fault is corrected.

It is another object of the present invention to provide safety apparatus for continuous rotary blow molding machines that permits higher operational speeds in that operator involvement in parison removal during the correction of a fault condition is eliminated.

These and other objects of the present invention are accomplished by a safety device including means for automatically diverting the flow of parison from the die head of the extruder upon detection of a fault and the stopping of the molding machine, conveyor means for receiving the diverted parison and carrying the parison to a receptacle for storage and subsequent regrinding and reworking, means for restarting the machine upon correction of the fault, cutting means operative a predetermined time after the restarting of the machine for cutting the continuously extruded parison and control means for simultaneously, with the operation of the cutting means, disabling the deflector means and thereafter disabling the conveyor means.

To ensure against the restarting of the machine with an operator still present in the extrusion area, there is further provided an openable and closable gate means. In the open condition, the gate means permits access to the extrusion area but precludes restarting of the machine. In the closed condition, the gate means precludes access to the extrusion area and permits restarting of the machine.

DESCRIPTION OF THE PREFERRED EMBODIMENT

Figure 1:
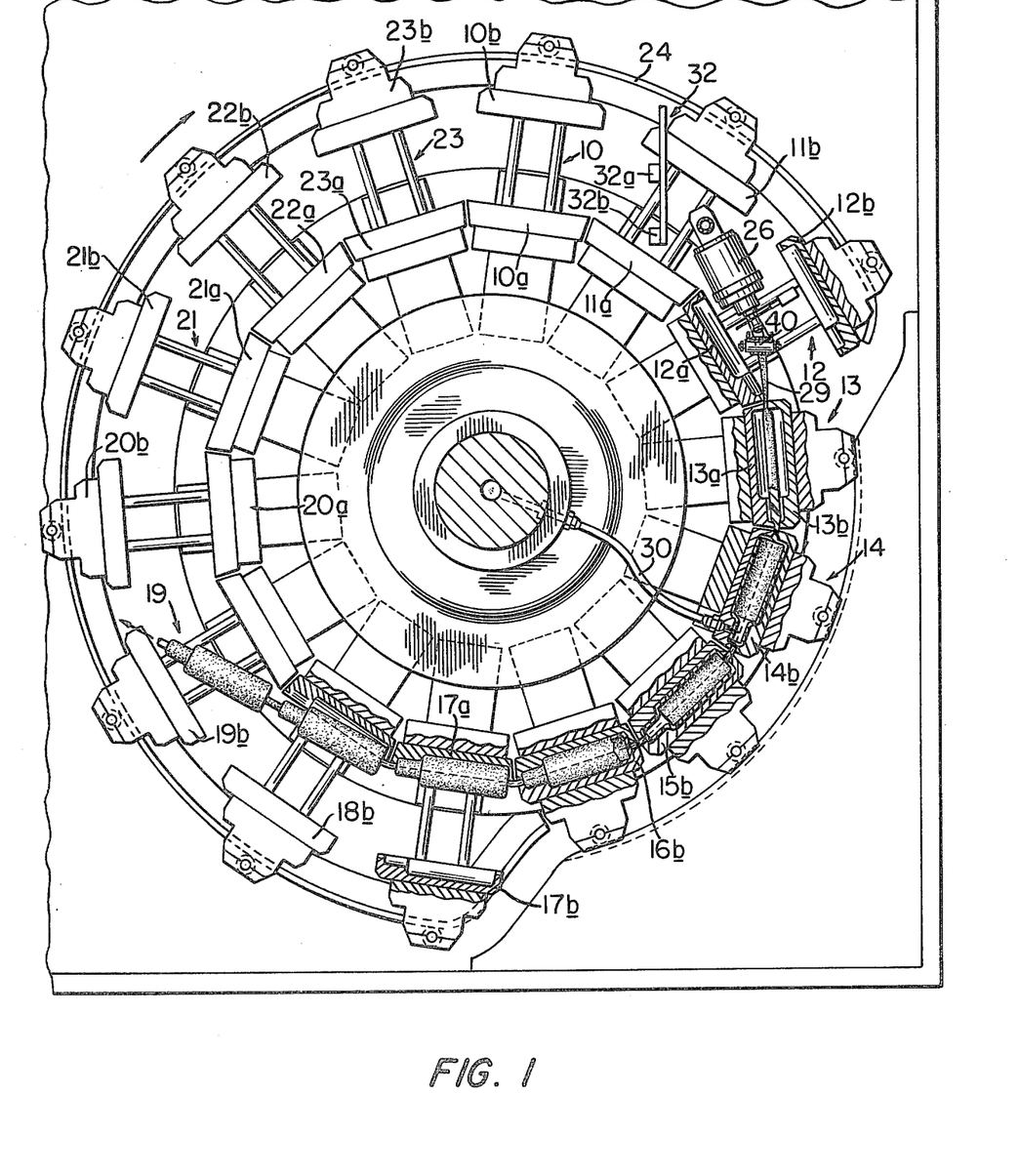
FIG. 1 is an elevational view of typical rotary continuous blow molding machine showing aspects of the safety apparatus of the present invention.

FIG. 1 illustrates a rotary continuous blow molding machine which is of conventional configuration. Prior art patents disclosing continuous blow molding machines include U.S. Pat. Nos. 2,515,093; 2,579,390; 2,950,501; 2,981,976; 2,985,914; 2,983,959; 2,967,328; 3,031,813; 3,042,103; 3,025,561; 3,020,595; 3,071,812; 3,198,861; 3,310,834; 3,538,211; 3,579,399; 3,833,700; 3,797,983; 3,792,946; 3,941,539; 4,005,966; and 4,039,644. Because the machine is conventional and does not constitute the invention herein claimed, it is shown generally with the following description of the machine provided as background.

The machine has a ferris-wheel type configuration with fourteen circumferentially spaced molds 10–23 located at its periphery. Each of the molds 10–23 includes a fixed inner mold 10a–23a and radially reciprocating upper molds 10b–23b coupled together by a pair of control rods. The upper molds include cam followers mounted on a cam track 24 that follows a generally circular path over about three-quarters of its length to maintain the upper and lower molds spaced apart and follows a generally eccentric path for the other part of its length to drive the upper molds down along the control shafts and into sealing engagement with the lower molds.

An extruder 26 is mounted tangentially of the wheel and between the upper and lower molds at about the two o'clock position on the machine. The extruder provides a continuous hot charge of plastic to a die head 28 from which a hot plastic tube 29 or parison is discharged. The parison thus flows continuously into the lower molds as the molds pass beneath the die head.

Also shown in FIG. 1 is one of the air hoses 30 coupled to the blow needle located in the lower mold 14a of the mold 14 through a control valve (not shown and which typically is cam-follower actuated). The blow needle is projected through the clamped off section of the injected parison and air under pressure is introduced to blow the parison in the shape of the upper and lower molds. As is well understood, also provided in a typical continuous rotary blow molding machine are further hoses which carry cooling fluid to the molds to bring about curing of the molded articles, a knockout pin, the mechanical control hardware and the like, all of which are conventional and need not be described.

In operation, the extruder 26 continuously extrudes the plastic tube 29. As the molds 10–23 approach the extruder they are moving in a circular path and are widely spaced. As the molds pass by and beyond the extruder, the tube is discharged in the lower mold. The upper molds follow the cam track to close down onto the lower molds and around the tube. The molds are locked together to seal off sections of the tube within the molds and the sections between the molds. Air is then introduced via the blow needle to conform the tube to the configuration of the molds. Cooling fluid is supplied to the molds to cure the molded article in the mold.

Following curing, the molded articles are vented, the upper mold is released from the lower mold as it follows the trajectory of the cam track away from the lower mold, a knockout pin, if need be, actuated and the molded articles ejected from the molds.

FIG. 1 shows a short curing cycle with the molded articles being ejected after about one-third a revolution of the molds. The curing cycle may be increased and discharge effected at about the 11 o'clock position simply by changing the path of the cam track.

A typical fault with rotary blow molding machines of the type shown in FIG. 1 is the failure to discharge a molded article. To this end, a bar-type detector 32 is provided. It includes photocell sensing units 32a and 32b which scan the opposed mold faces and, if either senses a molded article in a mold cavity, will shut down the machine. It is here that, prior to this invention, a dangerous condition existed. The operator would have to remove the molded article from one of the two molds and, with asbestos gloves, reach in and remove the parison discharging into the mold beneath the extruder 26, wipe clean the face of the die head 28, and restart the machine.

Figure 2:
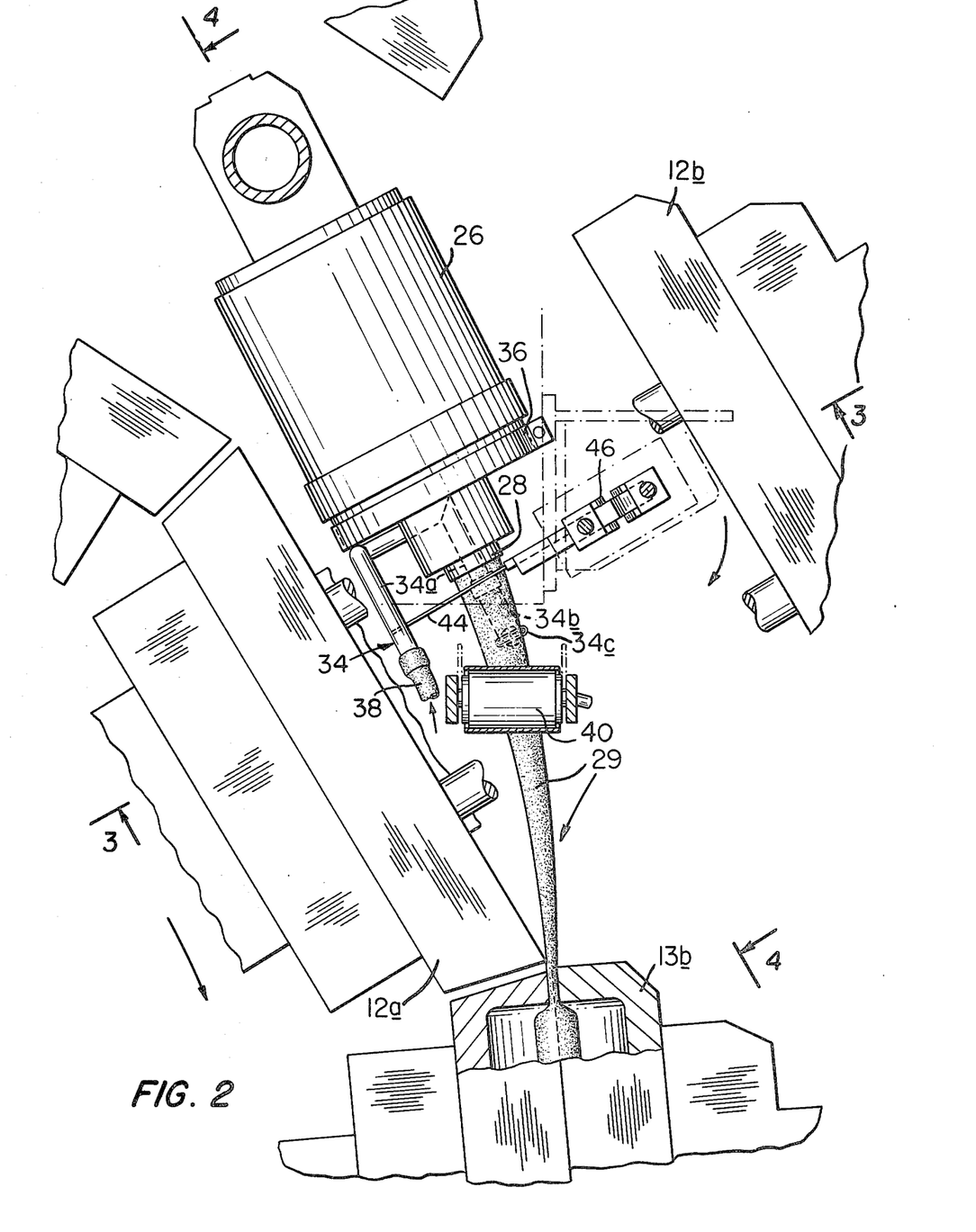
FIG. 2 is an enlarged view of the extrusion area of the machine depicted in FIG. 1 and showing aspects of the safety apparatus of the present invention.
Figure 3:
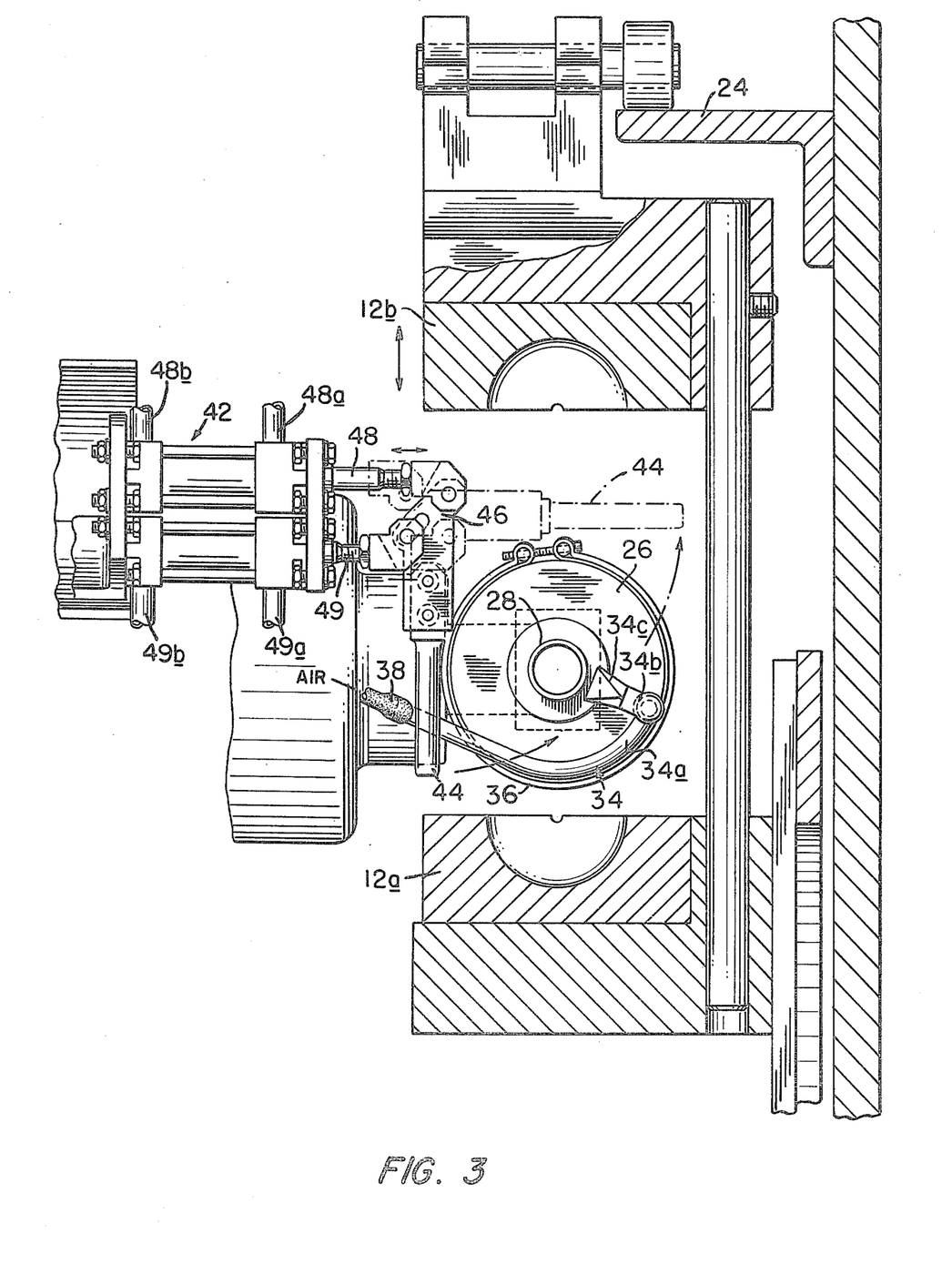
FIG. 3 is a sectional view of the extrusion area taken along line 3—3 of FIG. 2 and looking in the direction of the arrows.
Figure 4:
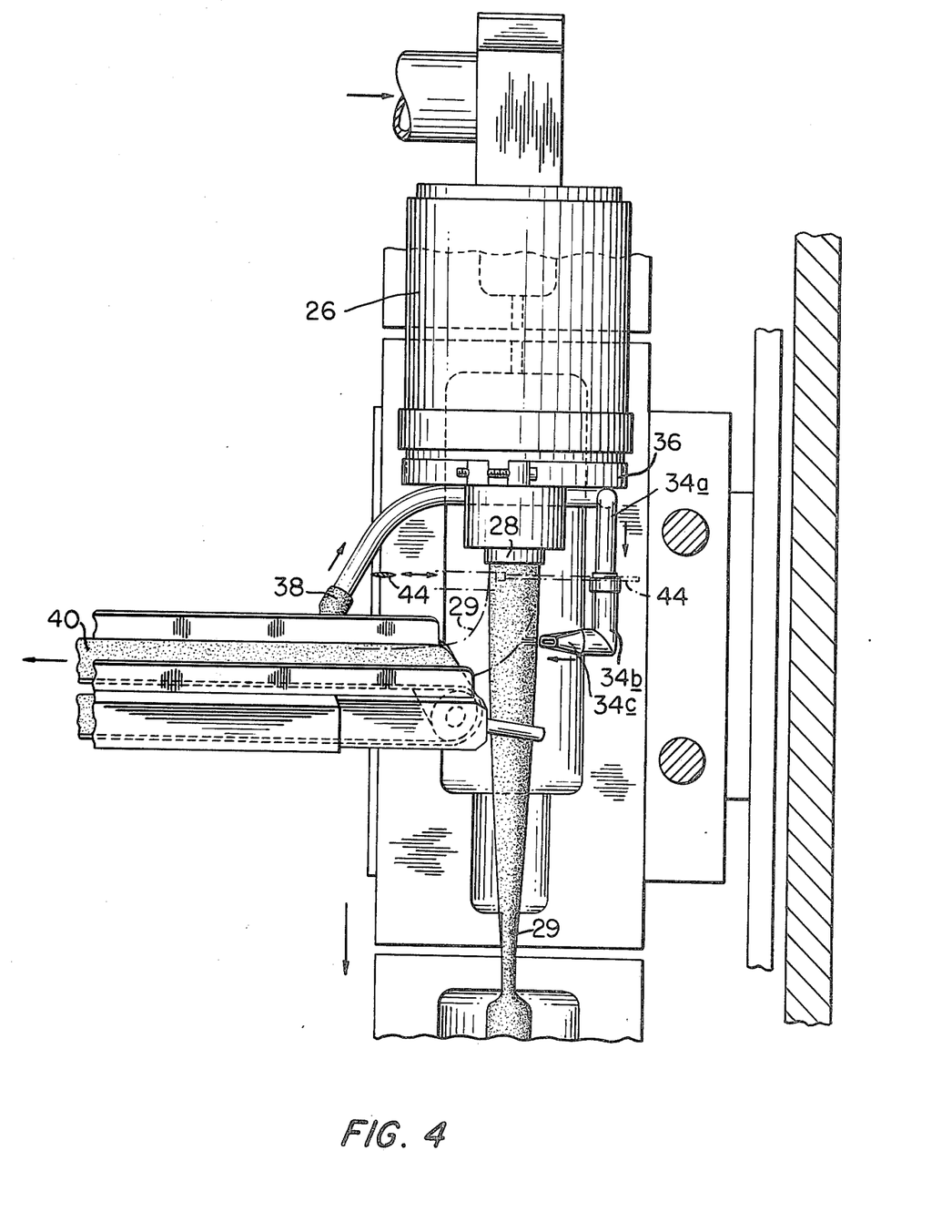
FIG. 4 is a section taken along line 4—4 of FIG. 2 showing the blow tube and conveyor of the safety apparatus.

In accordance with the present invention, there is provided a safety apparatus which eliminates operator involvement with the continuously extruded parison from the time a fault is first detected until the time the fault is corrected. The safety device includes a blow tube 34 having an arcuate section 34a mounted on the extruder at the extrusion end thereof by means of a clamp 36. The blow tube also includes a straight end 34b terminated by a nozzle 34c that extends laterally outwardly and behind (as viewed in FIG. 2) the die head 28 and the parison 29 extruded therefrom. A hose 38 is coupled at one end through a valve to a source of compressed air and coupled at its other end to arcuate section 34a. The source of air may be the same source of air for the blow needle.

Laterally spaced from the blow tube 34 and located in front of the die head 28 and parison (as viewed in FIG. 2) is a conveyor 40. The conveyor runs in the same direction as the air emitted by the blow tube 34. As will be explained more fully hereinafter, during machine shut-down, the hot parison extruded from the die head 28 is deflected onto the conveyor 40 by the blow tube 34. The conveyor carries the parison to a receptacle (not shown) from which the plastic is removed and reground for later reworking in the extruder 28. The conveyor 40 and blow tube 34 operate when the machine is shut down, with the conveyor also operating for a short time after the machine is restarted. Disablement of the conveyor and blow tube permit the extruded parison to be discharged directly into the molds as they rotate past the extruder.

Figure 8:
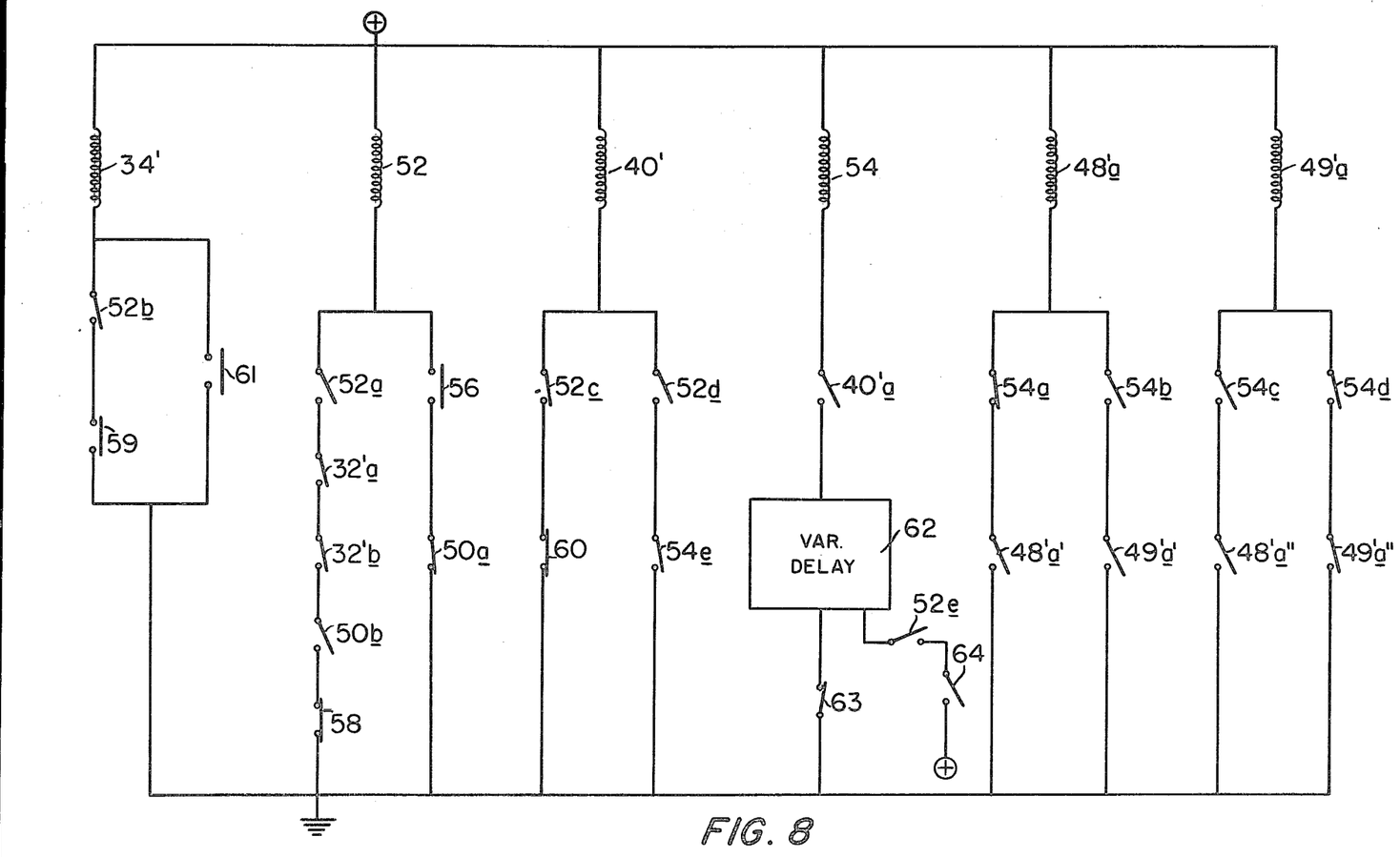
FIG. 8 is a simplified schematic diagram illustrating the control circuit means of the safety apparatus of the present invention.

Mounted to the side of the extruder is a two-jack cutting device 42 which may be of the type made by Scovill Manufacturing Company. The device includes a double-edged blade 44 having two at rest positions and mounted on a pivotal coupling member 46. The blade is located in a lateral plane separated a small distance from the plane of the die head 28. The coupling member, in turn, is secured to two pneumatic jacks 48 and 49 provided with charging inlet pipes 48a and 49b, respectively, and exhaust pipes 48b and 49a, respectively. Relay actuated valves supply in alternate cycles a charging air to the pipes 48a and 49b. The relays are shown in FIG. 8. With the jack 48 forced outwardly, the blade 44 is held in a position at right angles to the jacks. With the jack 49 forced outwardly, the blade is held in a position that is parallel to the jacks. The cutting device 42 is operated once after restarting of the machine to cut the parison 29 and permit the parison to discharge downwardly into the molds 10–23. Without the cutting device 42 and with the blow tube 34 no longer deflecting the parison 29 onto the conveyor 40, the parison 29 will still tend to be drawn onto the conveyor. The cutting device 42, with the blade 44 swinging in a ninety-degree arc either in a clockwise or counterclockwise direction, makes a clean cut in the parison 29 to permit resumption of production.

It is for this reason that the blow tube 34 need not be operated continuously during machine shut down. It must be operated for as long as it takes to initially deflect the parison onto the conveyor. Thereafter, the parison will be drawn onto the conveyor 40.

Figure 5:
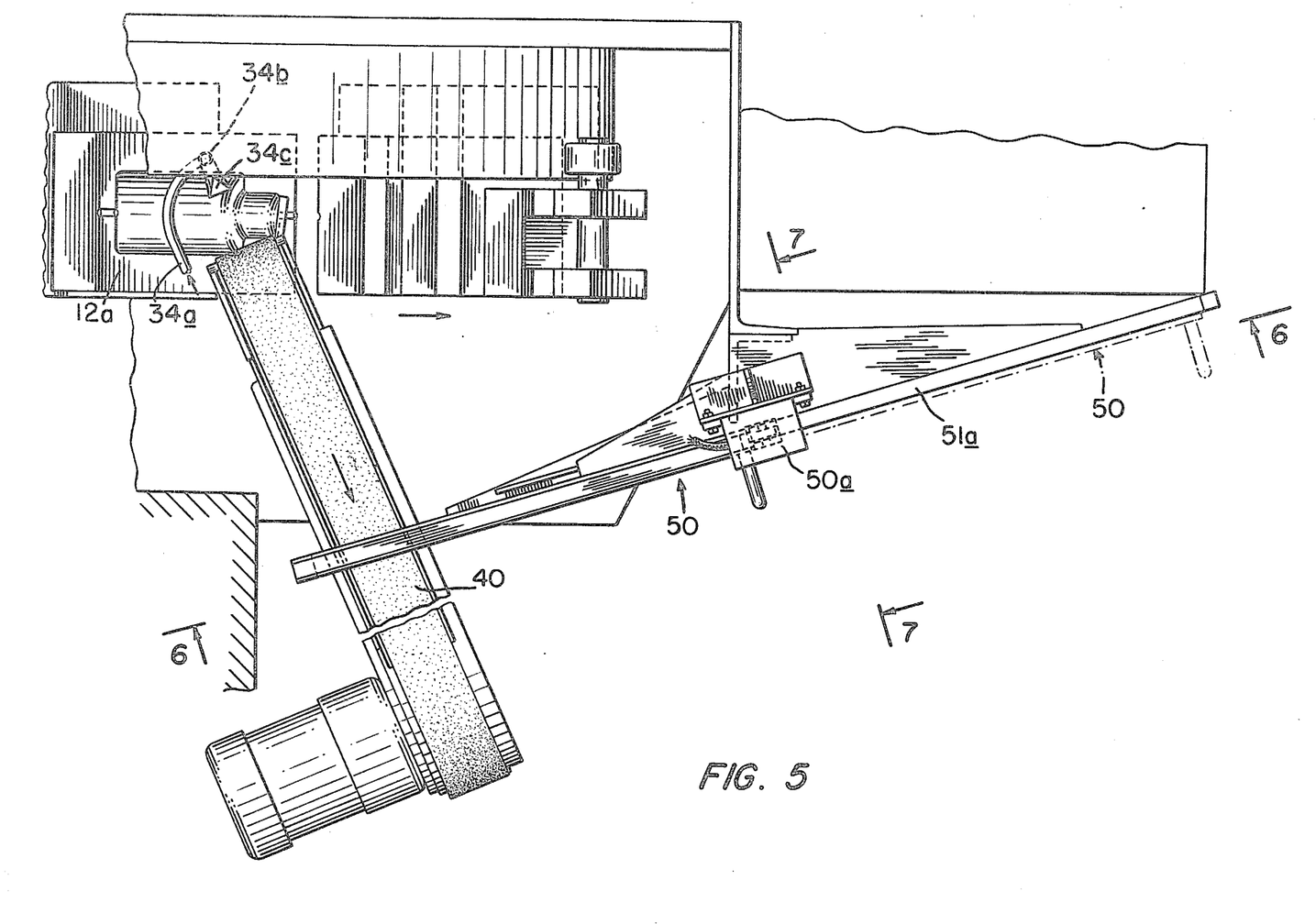
FIG. 5 is still another view of the machine depicted in FIG. 1 with the safety gate of the safety apparatus shown in detail.
Figure 6:
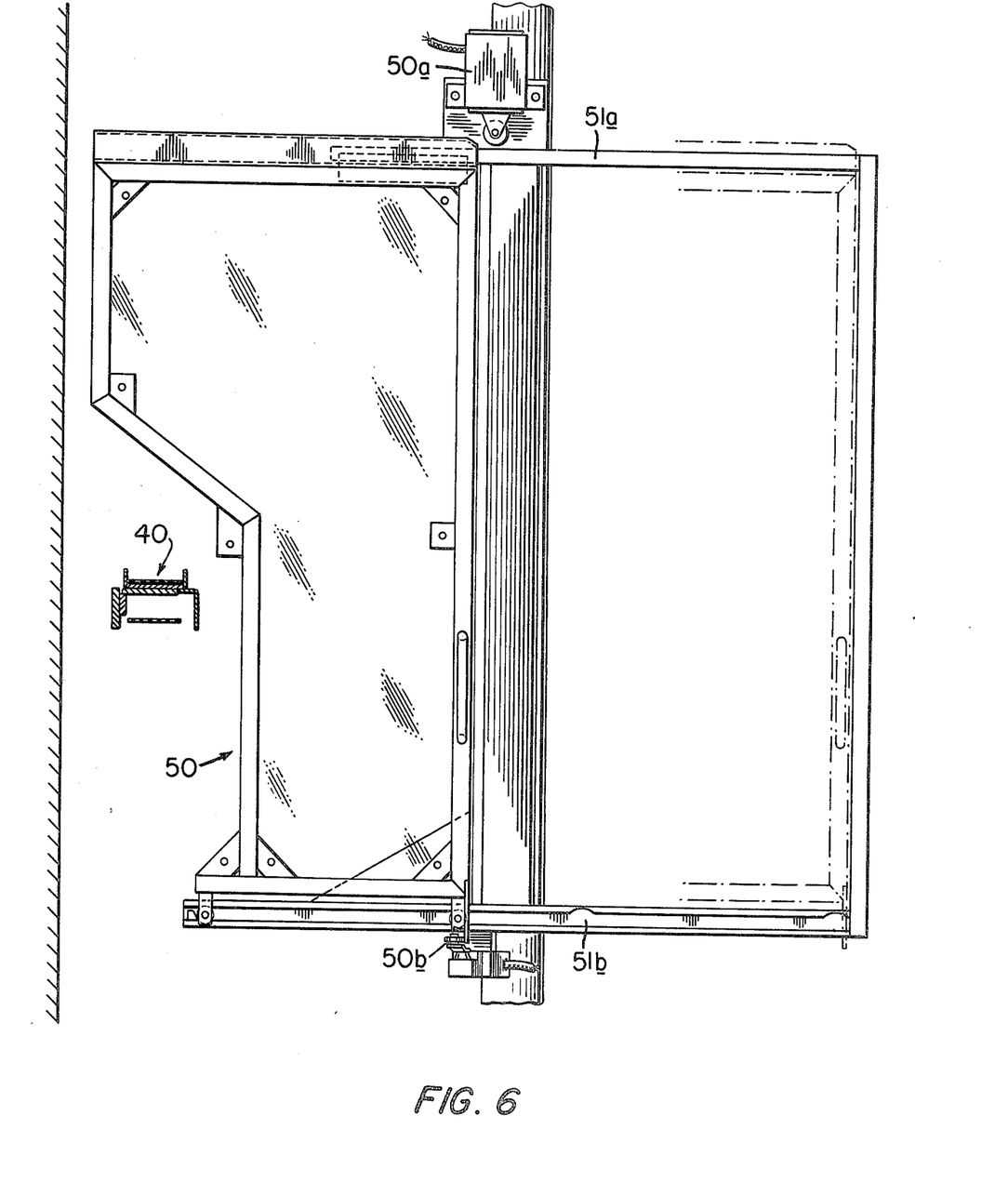
FIG. 6 is an elevational view showing the gate.
Figure 7:
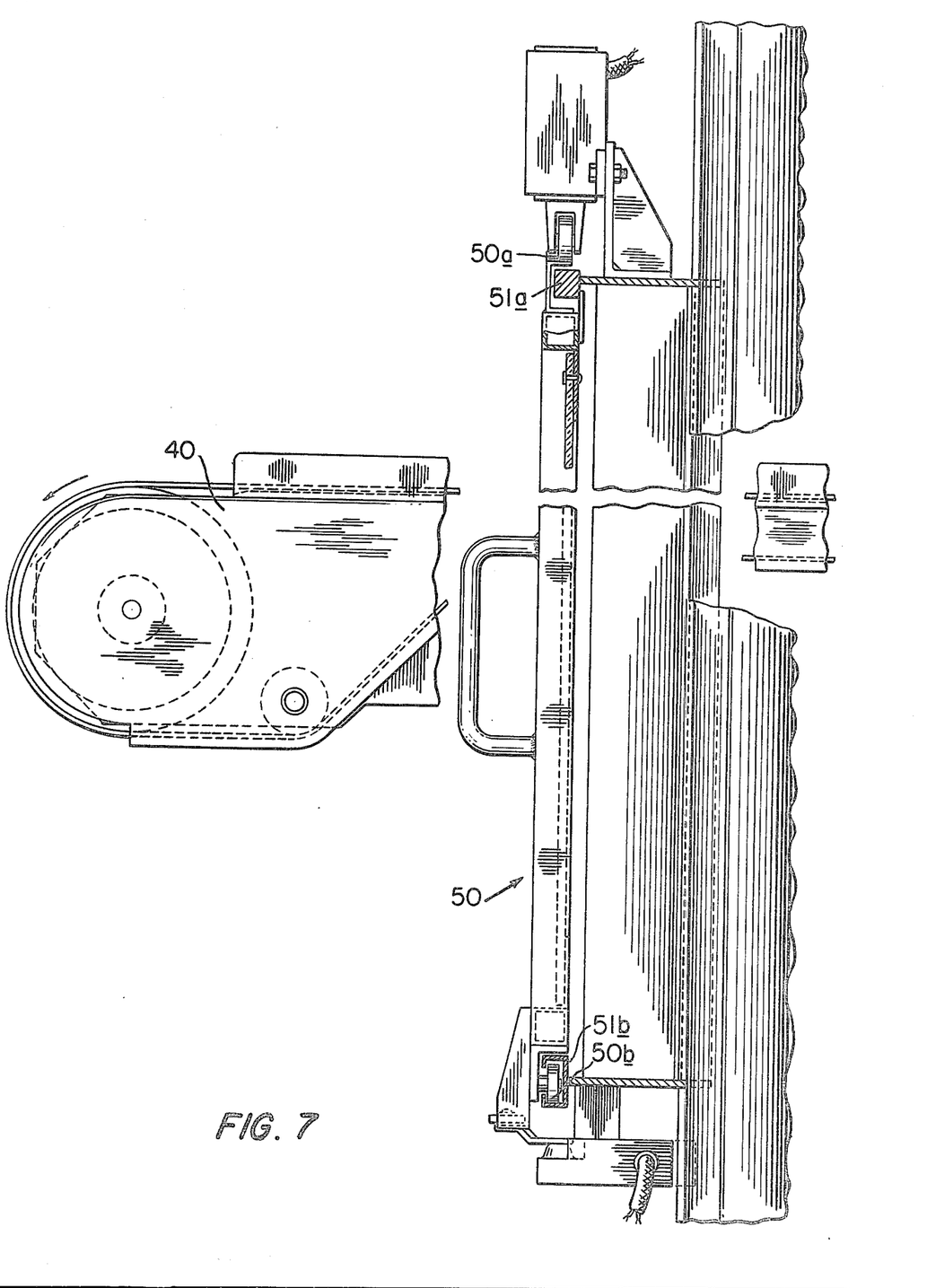
FIG. 7 is a section taken along line 7—7 of FIG. 5.

Mounted in front of the machine is a safety gate 50. The gate 50 moves laterally on rails 51a and 51b and, in its open position, permits access to the extrusion area. Forming a part of the safety gate are a normally closed microswitch 50a and a normally open microswitch 50b. The switches 50a and 50b are safety switches which permit restarting of the machine only when both switches are closed. This occurs only when the gate is closed.

Typical control circuitry for the present invention is shown schematically in FIG. 8. Provided there are five relays: motor control relay 52 which controls operation of the motor for the blow molding machine; blow tube control relay 34' which controls a valve (not shown) that permits the flow of compressed air to the blow tube 34; conveyor relay 40' which controls operation of the conveyor 40; cutter control relay 54 and cutter relays 48'a and 49'b responsive to the cutter control relay for actuating the valves (not shown) which open an air path to the pipes 48a and 49a of the jacks 48 and 49.

The relay 52 is coupled between a source of positive potential and ground through two separate circuits. The first circuit includes a starting switch 56 connected in series with the normally closed microswitches 50a of the gate 50. Thus, only if the gate 50 is closed will actuation of the start switch 56 be effective to energize relay 52 and start the machine.

The other circuit includes a first normally open contact 52a of the relay, series connected microswitches 32'a and 32'b associated with the photocell detectors 32a and 32b of the unexpelled article detector 32, the other normally open switch 50b associated with the gate 50 and a stop switch 58. This latter circuit functions to maintain relay 52 energized so long as the gate 50 is closed, an unexpelled article is not present in either the upper or lower molds of the molds 10-23 and the machine is not stopped intentionally.

The blow tube relay 34' is coupled between the source of positive potential and ground by a first circuit consisting of a normally closed contact 52b of relay 52 and a normally closed stop switch 59 and to a second circuit consisting of an override start switch 61.

The conveyor relay 40' is likewise coupled between the source of positive potential and ground through two different circuits. The first circuit includes a normally closed contact 52c of the motor control relay and a second normally closed stop switch 60. Unless stop switch 60 is actuated, the conveyor relay 40' becomes energized with de-energization of the motor control relay 52 so that the conveyor 40 starts immediately with the stopping of the machine. The second circuit includes a normally open contact 52d of the motor control relay 52 and a normally closed contact 54e of the cutter control relay 54. This second circuit ensures the continued operation of the conveyor after the motor is restarted and until the cutting device 42 is actuated.

The cutter control relay 54 is connected from the positive source to ground through a normally open contact 40'a of the conveyor control relay, a variable delay device 62 which may be, for example, a single shot amplifier and which provides a delay of about ten seconds and a normally closed safety switch 63. The variable delay device 62 is, in turn, controlled by a circuit consisting of a normally open contact 52e of the motor control relay 52 and a sensing switch 64 that may be closed momentarily by detection of rotation by the switch 64.

The blow molding machine may include one or more protrusions that extend axially of the wheel, and during rotation, close the sensing switch 64. Thus, when the machine is restarted, and while the conveyor is running and conveyor control 40' energized, the detection of rotation by the wheel will cause the generation of a single energization signal to be emitted, which occurs after about one revolution of the wheel, and the energization of the cutter control relay 54. Energization of the cutter control relay 54 will bring about the de-energization of the conveyor control relay 40' since contact 54e will open. De-energization of the conveyor control relay 40' is delayed also to permit the conveyor to run long enough to discharge all the parison accumulated on it into the receptacle.

The safety switch 63 is provided to maintain the cutter control relay disabled in the event the machine is run for cleaning and without the attendant operation of the extruder.

Relays 48'a and 49'a cause actuation of the jacks 48 and 49 in alternate cycles. To accomplish this result, relay 48'a is connected between the source of positive potential and ground through two circuits. The first circuit includes a normally closed contact 54a of relay 54 connected in series with a normally open contact 48'a' of the relay 48'a. The other circuit includes a normally open contact 54b of the cutter control relay 54 in series with a normally open contact 49'a' of the relay 49a. Thus, relay 48'a is energized in response to the energization of cutter control relay 54 only when relay 49'a is energized. It remains energized through its own contact 48'a' and the normally closed contact 54a of the relay 54. It bears repeating that relay 54 is energized only momentarily which permits this result.

The relay 49'a is likewise coupled through two circuits between the source of positive potential and ground. The circuits include series connected normally open contact 54c and normally open contact 48'a'' and series connected normally closed contact 54d and the normally open contact 49'a''. It will thus be observed that relays 48'a and 49'b are energized alternately and that one of the relays is energized with energization of relay 54 only when the other relay is energized. The relay which had been energized then drops out.

In operation, the detection of a fault, e.g. the detection by one of the photocells 32a and 32b of a molded article in the molds opens one or the other of the switches 32'a and 32'b and causes the de-energization of the relay 52 and the shutting down of the machine. De-energization of the relay 52 causes the relays 34' and 40' to energize. Energization of these relays permits compressed air to flow through blow tube 34 and deflect the parison 29 extruded from the die head 28 away from the molds and onto the conveyor 40, now operational, and traversing a path away from the molds.

Upon correction of the fault, the gate 50 is closed and the start switch 56 depressed to energize relay 52 and start the machine. At the same time, the supply of compressed air to the blow tube 34 is cut off. After about one revolution of the wheel, cutter control relay 54 is energized and the cutter device 42 actuated once. The blade 44 cuts the parison just as it leaves the die head 28 so that the parison thereafter discharged flows into the molds and not onto the conveyor. At the same time or shortly thereafter, the conveyor 40 is stopped.

Although the invention has been described herein with reference to a specific embodiment, many modifications and variations therein will readily be apparent to those skilled in the art. Accordingly, all such variations and modifications are included within the intended scope of the invention as defined by the following claims.

We claim:

1. Safety apparatus for continuous rotary blow molding machines of the type wherein the extruder continues to operate during the interruption of operation by the blow molding machine comprising deflector means mounted adjacent the extruder for deflecting the plastic tube discharged from the die head of the extruder away from the molds of the machine, said deflector means comprising an air blow tube coupled to one of the sources of pressurized air located in the machine for directing pressurized air against the plastic tube and thereby deflecting the plastic tube onto a conveyor means, conveyor means rotatable in a direction substantially coincident with the direction of flow of the plastic tube deflected by the deflector means and adapted to receive such deflected plastic tube and carrying the tube away from the machine, cutter means operative a predetermined time after machine operation is resumed and also mounted adjacent the extruder for cutting the plastic tube substantially at the die head to permit the plastic tube thereafter discharged from the die head to flow into the molds of the machine, and timing control means including means for automatically activating the deflector means for the time necessary to deflect the plastic tube onto the conveyor means and for automatically activating the conveyor means upon the interruption of operation by the machine and maintaining the conveyor means activated at least until such time as the machine operation is resumed.

2. Safety apparatus according to claim 1 wherein the air blow tube is mounted on the extruder.

3. Safety apparatus according to claim 2 wherein the air blow tube comprises a first arcuate section secured to the extruder and a second straight section extending outwardly from the extruder and behind the plastic tube and including a nozzle for directing the pressurized air against the plastic tube.

4. Safety apparatus according to claim 2 wherein the cutter means comprises a pivotal double-edged blade and a pair of reciprocating jacks for alternately driving the cutter to pivot in a ninety degree arc across the face of the extruder die head.

5. Safety apparatus according to claim 2 wherein the timing control means further comprises means for restarting the blow molding machine, said safety apparatus further comprising gate means movable between an open position to provide operator access to the molds of the molding machine and a closed position, said gate means including switch means coupled to the timing control means and operative to enable the restarting means only when the gate means is in a closed position.

6. Safety apparatus according to claim 2 wherein the timing control means further comprises means responsive to the rotation of the blow molding machine after the restarting of the machine for activating the cutter means once a predetermined time after the restarting.

* * * * *